(No Model.)
E. CASE.
FRUIT PICKER.
No. 256,818.  Patented Apr. 25, 1882.
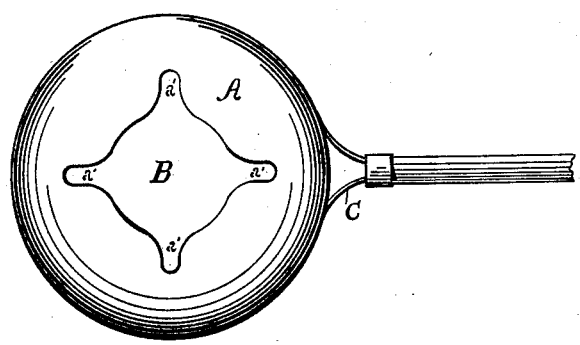
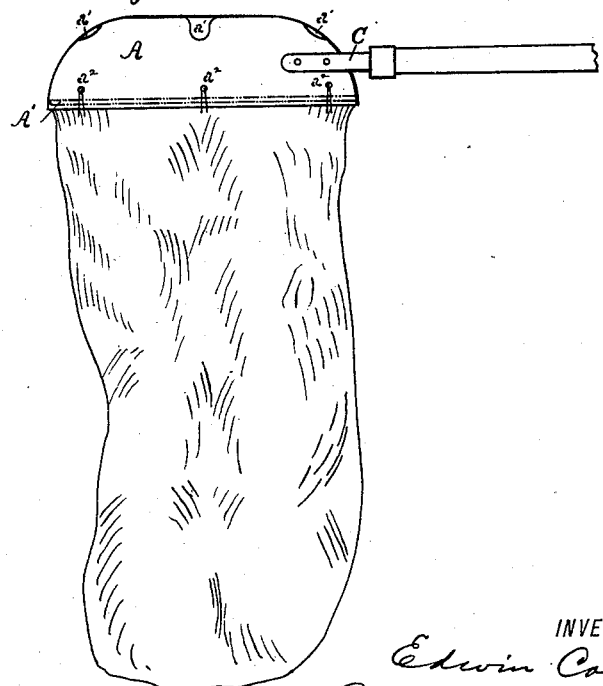
WITNESSES
Samuel E. Thomas.
J. Edward Warren
INVENTOR
Edwin Case
By W. W. Leggett
Attorney
N. PETERS, Photo-Lithographer, Washington, D. C.

UNITED STATES PATENT OFFICE.

EDWIN CASE, OF EAST TOLEDO, OHIO.

FRUIT-PICKER.

SPECIFICATION forming part of Letters Patent No. 256,818, dated April 25, 1882.

Application filed January 31, 1882. (No model.)

*To all whom it may concern:*

Be it known that I, EDWIN CASE, of East Toledo, county of Lucas, State of Ohio, have invented a new and useful Improvement in Fruit-Pickers; and I declare the following to be a full, clear, and exact description of the same, such as will enable others skilled in the art to which it pertains to make and use it, reference being had to the accompanying drawings, which form a part of this specification.

This invention relates to a device for picking fruit; and the novelty consists in the construction and arrangement of parts, as will be more fully hereinafter set forth, and specially pointed out in the claim.

In the drawings, Figure 1 is a plan view of my invention. Fig. 2 is a side elevation.

Referring to the drawings, A is a concavo-convex frame, of thin metal, with an opening in the center, B, large enough to admit the ready passage through it of any fruit which it is desired to pick. An opening five inches in diameter is a suitable size for apples. A smaller diameter would answer for smaller fruit. This frame A is curved from its inner to its outer edge in a convex form, the convexity being on the outer side. On the inner edge, at several different points, (preferably four, at equal distances from each other,) slots $a'$ $a'$ are cut of any desired depth and width—one inch in depth and three-eighths of an inch in width would be a very suitable size—the sharp corners thus made on the inner edge of rim being rounded off. On the curved side of this disk or band, between the inner and outer edges below one of the slots and on a line with two of them, a shank, C, or tang is fastened for the purpose of securing it to a pole. This will bring two of the slots on a line with the pole, as shown in the figure, while the other two will be on a line at right angles to it. To the lower outside edge of the disk or band a small sack is attached, suited to catch and hold the fruit when picked. The mouth of the sack is sewed or secured to a wire ring (represented by the dotted line A') which fits closely inside the lower or outer edge of the disk A, and is made fast to it by cord or wire passing through small holes $a^2$ $a^2$, made for that purpose in the lower or outer edge of the disk or band A. The mouth of the sack and the ring to which it is attached are thus brought under and within the outer edge of the disk A, to which it is attached, so that the sack is protected from being worn and torn loose from the wire ring by rubbing against the limbs of the trees while in use.

This device, attached to a pole of required length, is designed to supersede the use of ladders in picking fruit. When placed over or around the fruit and moved so as to bring the stem of the fruit into one of the slots, a pushing, pulling, or simply rolling motion of the pole in the hand will force the fruit from the limb into the sack. In actual use, especially in picking fruit with short stems, a slight motion of the wrist is sufficient to turn the pole all that is required, or about half-way round. This motion presses the lower edge of rim A against the limb of the tree, while the upper portion of the rim is pressed against the fruit, and thus forces them apart without shaking or jarring of the limb, whereby other fruit might be thrown to the ground, as is often done when the limb is bent down by pulling, and flies back when the stem of the fruit is broken from it. When the fruit is high up upon the tree a little push with a rolling motion of the pole takes it off without shaking the limb, the force being in a line with the direction of the limb. Moreover, in the use of my invention it makes no difference as to the relative positions of the fruit and the picker, whether the picker is placed over it from above, from below, or from either side, since when the fruit is once under the disk or band A a motion of the pole throwing the fruit toward the center of the picker will invariably force it off and deposit it in the sack.

The shape of this picker effectually prevents its bruising the fruit, since in the act of picking the fruit is brought under the curved disk or band A, the pressure of which would not bruise the fruit.

By the use of this invention ripe soft fruit can be thus picked with as little liability to be bruised as though picked by hand.

It will be observed that the slots $a'$ are arranged at the bend between the sides and top of the frame, and that the fruit will thus have a bearing of a greater portion of its surface upon the frame, preventing bruising the same in employing the force necessary to sever it from the tree, and also that this is true whether the device be used either to push or pull upon the fruit or to force it sidewise.

I am aware that the slot has been before employed for a similar purpose in straight frames; but in such cases the limited bearing of the fruit upon the frame tends to bruise it.

What I claim as new is—

In a device for gathering fruit, the concavo-convex frame A, having aperture B and radial slots $a'$ formed in the curve of the frame between the sides and top, and having handle-socket C, constructed and adapted to serve in relation to a sack secured to the edges of the said frame and a pole, as set forth.

In testimony whereof I sign this specification in the presence of two witnesses.

EDWIN CASE.

Witnesses:
J. D. CARTWRIGHT,
H. A. ROOT.